United States Patent
Ciocarlie et al.

(10) Patent No.: US 8,531,706 B2
(45) Date of Patent: Sep. 10, 2013

(54) REQUESTING CAPABILITIES OF A PRINTER AND RECEIVING CAPABILITIES OF A PRINTER AND A PRINT SERVER

(75) Inventors: Mihai Ciocarlie, Timisoara (RO); Janeen E. Jahn, Boulder, CO (US); Marquis G. Waller, Franklin, OH (US)

(73) Assignee: Ricoh Company, Ltd, Tokyo (JP)

( * ) Notice: Subject to any disclaimer, the term of this patent is extended or adjusted under 35 U.S.C. 154(b) by 113 days.

(21) Appl. No.: 13/032,895

(22) Filed: Feb. 23, 2011

(65) Prior Publication Data
US 2012/0212773 A1 Aug. 23, 2012

(51) Int. Cl.
*G06F 3/12* (2006.01)
(52) U.S. Cl.
USPC .......................................................... 358/1.15
(58) Field of Classification Search
USPC .......................................................... 358/1.15
See application file for complete search history.

(56) References Cited

U.S. PATENT DOCUMENTS

| | | | | |
|---|---|---|---|---|
| 2004/0041913 | A1* | 3/2004 | Takasumi et al. | 348/207.2 |
| 2004/0165211 | A1* | 8/2004 | Herrmann et al. | 358/1.15 |
| 2005/0243362 | A1* | 11/2005 | Sakuda et al. | 358/1.15 |
| 2010/0309507 | A1* | 12/2010 | McCann | 358/1.15 |
| 2010/0328707 | A1* | 12/2010 | Miyake | 358/1.15 |
| 2012/0140265 | A1* | 6/2012 | Laursen et al. | 358/1.15 |

* cited by examiner

*Primary Examiner* — Eric A Rust
(74) *Attorney, Agent, or Firm* — Duft Bornsen & Fettig, LLP (57) ABSTRACT

The systems and methods presented herein provide for delivery of a set of capabilities that encompasses system-level capabilities and device capabilities via a print protocol of a physical printer. For example, a printer object may respond to a print protocol request for capabilities of a physical printer with a set of capabilities that differs from the actual capabilities of the physical printer than would be typically delivered in response to such a request. The printer object comprises the capabilities of the physical printer. The capabilities of the physical printer are accessible via the print protocol of the physical printer. The printer object processes a request from the client system via the print protocol and in turn provides a set of capabilities that is different from the capabilities of the physical printer in response to the request.

17 Claims, 6 Drawing Sheets

FIG. 6 though a print shop architecture.

REQUESTING CAPABILITIES OF A PRINTER AND RECEIVING CAPABILITIES OF A PRINTER AND A PRINT SERVER

FIELD OF THE INVENTION

The invention relates to processing print jobs though a print shop architecture.

BACKGROUND

Larger enterprises often employ fairly complex print shop architectures to address their various printing needs. For example, members of an organization may use local printers for simple desktop publishing (e.g., letters, memorandums, pictures, etc.). However, when the organization requires more sophisticated and/or larger volume printing, the organization may employ a print shop architecture comprising a number of higher-end printers (e.g., multifunction printers, production printing systems, etc.) that are capable of providing more functionality and/or print volume.

These print shop architectures are typically managed by a print server that is operable to receive print jobs from a plurality of clients via host system devices (e.g., networked computer systems, mobile devices, etc.). The seamless integration of the printers in such an environment, however, is often difficult to implement. For example, printers and their specific capabilities may not be fully recognized by individual client devices. The print server is configured to manage the hardware and software assets of all the printers in the print shop architecture such that a user can easily identify a particular printer. In this centralized print environment, system administrators and other information technology personnel can also access and control the features of the printers.

Typically, the print server is configured with a plurality of features and protocols of the various printers controlled by the print server. For example, each printer managed by the print server may have its own print capabilities (e.g., double-sided printing, stapling, collation, etc.) and/or print protocols (Hot Folder, Job Definition Format or "JDF", Job Messaging Format or "JMF", line printer or "LPR"), that differ from other printers in the print shop architecture. Before such centralized management, a client device would install a printer driver that included the printing capabilities of the printer. The printer driver also establishes the print protocol for the client device to communicate with and control the printer. The print server maintains the printer drivers for the physical printer.

The print server presents this functionality to the client device such that a user may print a document to a particular physical printer. For example, when a user wishes to print a document to a particular physical printer, the user may communicate with the print server to access that physical printer. Prior to printing a particular print job, a client may occasionally wish to know the print capabilities and other options that may be available on a particular printer. In such a case, the client may transfer a query to the printer to obtain the device capabilities or "DEVCAPS" of the printer. These queries are operable to trigger a response by the printer to return all of the print capabilities of the printer. With the print capabilities of the printer in hand, the client may generate a print job and transfer the print job to the physical printer via the print server for printing.

This type of user defined access to the printer capabilities can circumvent the principles of centralized printer management in a print shop architecture. That is, a system administrator (or a print shop operator) managing the print shop architecture may implement a policy that precludes a client from accessing certain printer features so as to suit the particular printing needs of an organization. Present protocol standards of the devices within a print shop architecture, however, provide no means for hiding these features from the client. Accordingly, the client may expect a print job with a particular set of features that is actually printed with undesired features.

SUMMARY

Embodiments herein provide a printer object of a printing system with the ability to deliver a set of capabilities that encompasses system-level capabilities and printer capabilities via a print protocol of a physical printer. More specifically, the various embodiments shown and described herein provide a manner for responding to a print protocol request for device capabilities of a physical printer with a set of capabilities that includes system capabilities of a print processing device, or other print process device, as well as device capabilities of a physical printer communicatively coupled thereto. The system capabilities of the print processing device may define, among other things, when a print job is to be printed (e.g., delay printing, expedite printing, provide for periodic printing, etc.). The system capabilities may also include forced settings and prohibitions. For example, system capabilities may define how certain settings of the print processing device may not be changed by a user and/or prohibit the user from obtaining certain other settings of the print processing device. Of course, the invention is not intended to be limited to simply interfacing with a physical printer to obtain the device capabilities. The invention may also include interacting with a software module that provides the device capabilities of the physical printer.

In one embodiment, a print processing device is operable to interface between a client system and the physical printer, and to process the print job for printing via the physical printer. The print processing device includes a printer object communicatively coupled to the physical printer. The printer object includes capabilities of the physical printer (e.g., stores or otherwise maintains the printer capabilities). The printer object is operable to process a request for the device capabilities of the physical printer from the client system via a print protocol of the physical printer (e.g., a Device Details Query of a Job Messaging Format within a Job Definition Format protocol). In response to the request, the printer object provides a set of system capabilities of the print processing device and at least a portion of the device capabilities of the physical printer. In other words, the printer object overrides the request by providing a response with different capabilities to the client system.

In doing so, the printer object may be operable to block at least a portion of the system capabilities of the print server from the client system in response to the request. Alternatively or additionally, the printer object may be operable to block at least a portion of the device capabilities of the physical printer from the client system in response to the request. The printer object may configure the system capabilities in a protocol response to the request such that they may be presented to the client via a virtual printer for print job generation.

The printing system may also include a user interface operable to access the printer object to change the set of capabilities provided to the client system. For example, the printer object may be reconfigured via the user interface to add or remove system capabilities of the print server and/or device capabilities of the printer.

The various embodiments disclosed herein may be implemented in a variety of ways as a matter of design choice. For example, the embodiments may take the form of computer hardware, software, firmware, or combinations thereof. In one embodiment, a method is operable within the printing system to perform the functionality of the printer object. In another embodiment, a computer readable medium is operable to store software instructions that are operable to implement the various steps in the method. Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
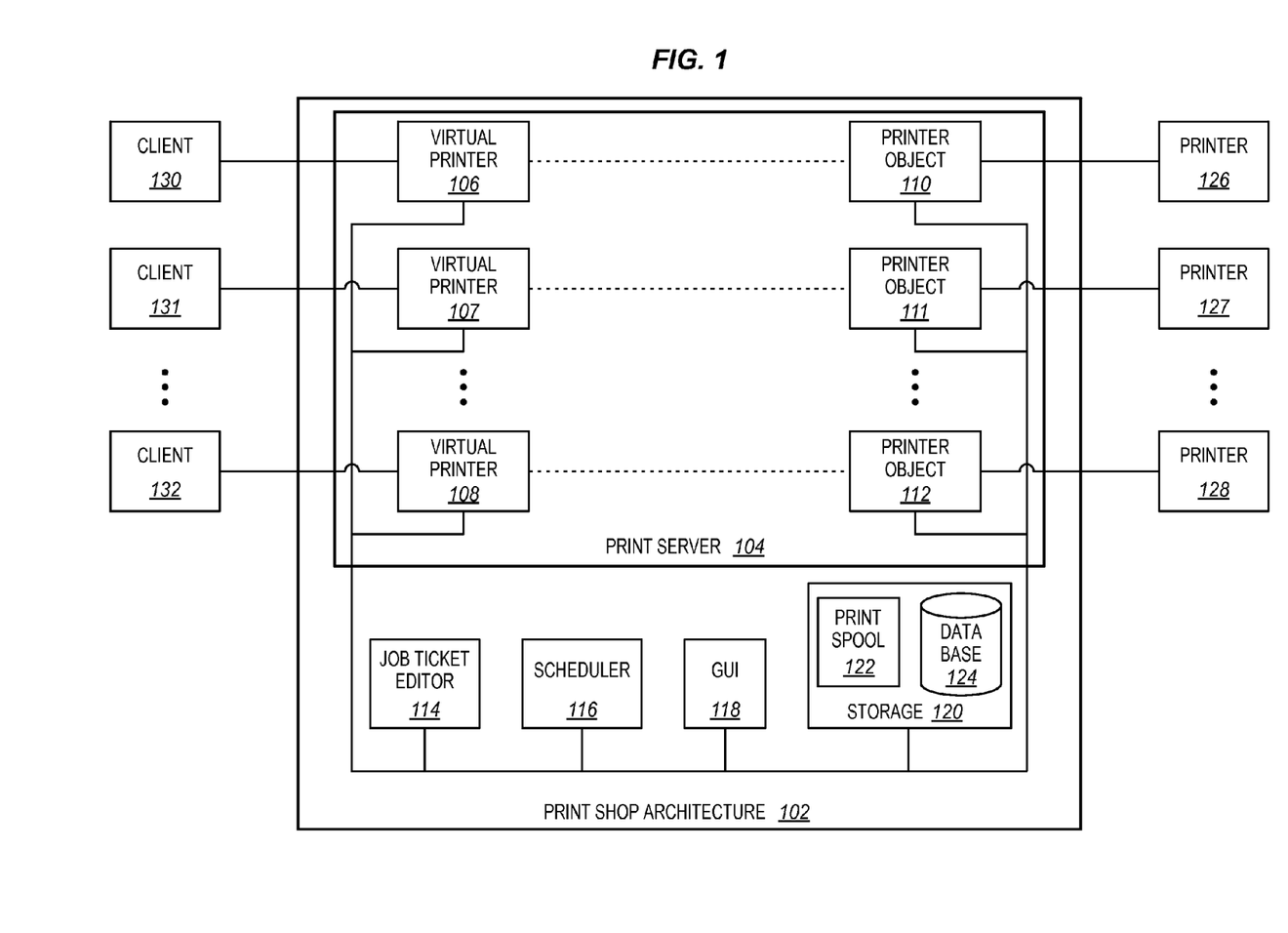
FIG. 1 is a block diagram of a print shop architecture in an exemplary embodiment.

FIG. 1 is a block diagram illustrating a print shop architecture 102 (also referred to herein as a printing system) in an exemplary embodiment. The print shop architecture 102 couples one or more clients 130-132 to one or more physical printers 126-128 to provide printing and print workflow services to the clients 130-132. The print shop architecture 102 is operable to receive print jobs and job tickets from the clients 130-132 for printing via printers 126-128. The clients 130-132 may include banks, credit card companies, or other entities that generate print jobs (e.g., monthly bank statements, monthly credit card bills, etc.) on host computer systems via software applications that interface with the print shop architecture 102. The print shop architecture 102 may receive the print jobs from the clients 130-132 in a number of different formats, such as Portable Document Format (PDF), Mixed Object: Document Content Architecture (MO:DCA), Advanced Function Printing (AFP), etc. Job tickets may be received from the clients 130-132 in a number of different formats, such as Job Definition Format (JDF), Print Production Format (PPF), Portable Job Ticket Format (PJTF), etc. A job ticket comprises print parameters that define how a print job is to be printed on the printers 126-128. The printers 126-128 generally include systems for transforming print data of the print jobs onto a suitable printable medium, such as paper, and generally are large production printing systems for high volume printing.

In one embodiment, a client is configured with a graphical user interface (GUI) 133 and a request unit 134, as illustrated with the client 132. The GUI 133 allows a user to edit and/or confirm print parameters associated with a print job being transferred to the print shop architecture 102. The GUI 133 also allows the user to preview the print jobs based on the print parameters. For example, the GUI 133 may illustrate to the user how the print job under consideration shall look after printing. The GUI 133 is also operable to interact with the request unit 134 such that the user may request the device capabilities of a physical printer 126-128 and receive a set of system capabilities of the print server 104 and device capabilities of a physical printer 126-128. For example, the user may request certain printer capabilities through a DEVCAPS request via the GUI 133. The request unit 134 may transfer the DEVCAPS request to a virtual printer, such as virtual printer 108, and receive a set of system capabilities of the print server 104 and device capabilities of a physical printer 126-128. In this regard, the request unit may be operable to provide direct communication with a corresponding virtual printer.

The print shop architecture 102 includes a print server 104 (also referred to herein as a print processing device) having one or more virtual printers 106-108. The virtual printers 106-108 are generally software modules that are operable within the print server 104 to communicate with the clients 130-132 and provide an interface to the clients 130-132 that allows the clients 130-132 to set up print jobs and send the print jobs (and job tickets associated with the print jobs) to the printers 126-128. The print shop architecture 102 also includes a corresponding plurality of printer objects 110-112. The printer objects 110-112 are similar to printer drivers in that the printer objects 110-112 comprise print capabilities of corresponding printers 126-128. The printer objects 110-112 also include system capabilities of the print shop architecture 102 (i.e., delayed printing features, expedited printing features, periodic printing features, etc.). Accordingly, each printer object generally includes all of the printing capabilities of a printer and establishes the communications and control for that printer. Typically, a 1:1:1 correspondence exists between the virtual printers, the printer objects, and the printers. That is, a virtual printer typically interfaces to one printer object and that printer object comprises the printing capabilities of one printer.

When the clients 130-132 send print jobs and job tickets to the print shop architecture 102, the job tickets are copied into a database 124 located in storage 120 of the print shop architecture 102. The print jobs and job tickets are then placed in a print spool 122 of storage 120 as open print jobs prior to queuing the print jobs for printing. A scheduler 116 identifies the open print jobs located in the print spool 122 and attempts to schedule the print jobs in queues of the printer objects 110-112. Typically, the scheduler 116 attempts to schedule the open print jobs with one of the printer objects 110-112 corresponding to the virtual printer that received the print job. For example, if the client 130 transmitted the print job to the virtual printer 106, then the scheduler 116 may first attempt to place the print job in a print queue of the print server object 110. Generally, the printer objects 110-112 interface with corresponding printers 126-128 to queue and process print jobs prior to transmitting the print jobs to the printers 126-128.

A print operator may use a Graphical User Interface (GUI) of the print shop architecture 102 to control and identify the status of print jobs in the print shop architecture 102. For example, the GUI 118 may provide a list of print jobs in queues of the printer objects 110-112 and other general information about the status of open jobs in the print spool 122. The print operator may also use a job ticket editor 114 to modify job tickets associated with both open and queued print jobs. Using job the ticket editor 114, the print operator may modify job tickets to change various print options for a print job associated with the job ticket, such as duplexing, stapling, media type, etc. The print shop architecture 102 provides a number of printing and workflow services to the clients 130-132 which will become more readily apparent through the following discussion and related figures.

Although shown are described with respect to a particular number of clients, virtual printers, printers, and printer objects, the invention is not intended to be so limited. The print server 104 may be operable to provide printing services to more or fewer clients and/or include more or fewer printers than shown in the exemplary embodiment.

Figure 2:
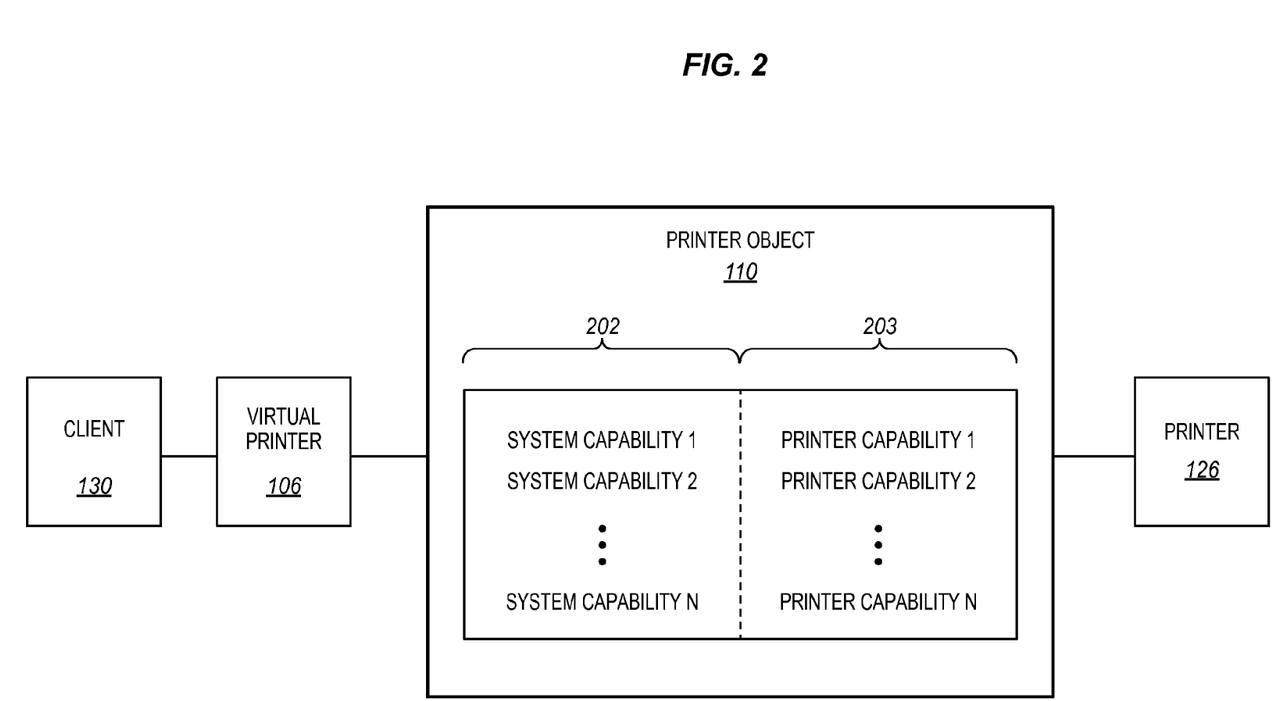
FIG. 2 is a block diagram of a printer object in a print server of the print shop architecture in an exemplary embodiment.

FIG. 2 is a block diagram of a printer object 110 in the print server 104 of the print shop architecture 102 in an exemplary embodiment. The exemplary embodiment is also applicable to the other printer objects 111 and 112. As mentioned above, the printer object 110 maintains a plurality of device capabilities 203 of the printer 126, operating similar to a print driver. In this embodiment, the printer object 110 is also configured with a plurality of system capabilities 202 that provide various features of the print server 104 that may be selected for the printing of a print job. For example, the client 130 may generate a print job on a regular basis, such as bills that are to be mailed out monthly. The print job, in this regard, may be automatically generated and delivered to the virtual printer 106 for printing via the printer 126. Based on the periodic nature of the print job, the print job may be configured with identifying features that prompt the virtual printer 106 to schedule the print job for printing. More specifically, the client 130 may select a system capability command via the print protocol of the printer 126 that provides for periodic printing of print jobs. Other examples of system capabilities of the print server 104 include delayed printing and expedited printing; however, such capabilities are typically a matter of choice in the design of the management functionality of the print server 104.

Each of the device capabilities 203 of the physical printer 126 may be selected by the client 130 via the print protocol of the printer 126 to prepare print jobs for printing via the printer 126. Examples of various print protocols include HotFolder, LPR, JMF, and JDF. Hot Folder provides a relatively quick way of sending image files to the printers 126-128. The Hot Folder interface displays the printers 126-128 to the clients 130-132 through user created "hot folders" that serve as drop-off points for images where printing is desired. LPR is a well-known network protocol for submitting print jobs to a remote printer. JDF is an extensible XML-based protocol built upon existing technologies of the International Cooperation for the Integration of Processes in Prepress, Press, and Postpress Organization (CIP4) Print Production Format and the Adobe Portable Job Ticket Format. JDF provides the ability to unify print aspects of print jobs and bridge communication between printers and management functionality, regardless of the tools being used. JDF works in tandem with a counterpart format, JMF. JMF provides for production components of a JDF workflow to communicate management functionality. JMF provides a series of queries and commands to elicit information about JDF print jobs and determine system capabilities of the print server 104 and/or printer capabilities of the printers 126-128.

As mentioned, a problem exists when the client 130 wishes to use the capabilities to generate the print jobs and that the client 130 may select certain capabilities which management functionality does not want selected. This functionality of the print shop architecture 102, and more specifically of the printer object 110, will now be discussed with reference to the method 300 of FIG. 3.

Figure 3:
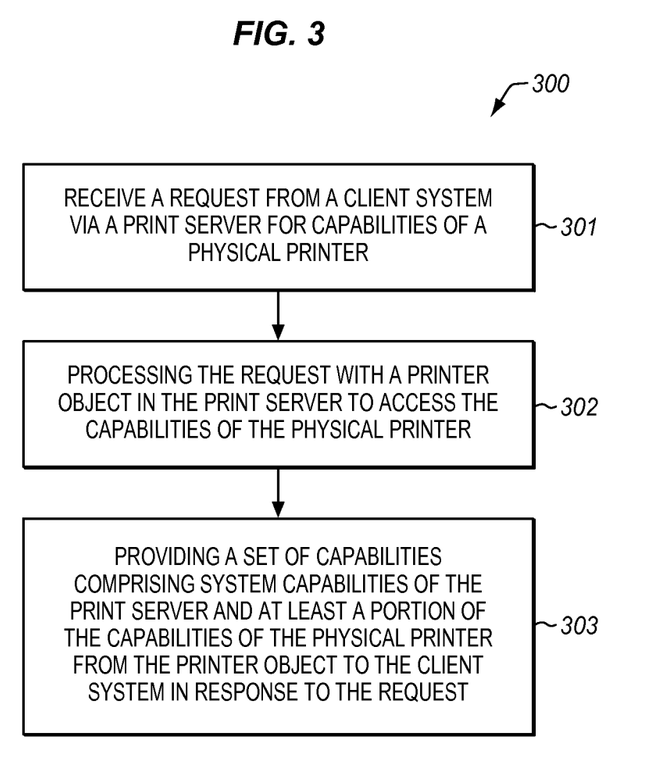
FIG. 3 is a flow chart of a method for presenting various system capabilities and device capabilities of the print shop architecture to a client in an exemplary embodiment.

FIG. 3 is a flow chart of a method 300 for presenting various system capabilities 202 and device capabilities 203 of the print shop architecture 102 to the client 130 in an exemplary embodiment. The method 300 initiates when the client 130 transfers a request to the print server 104 requesting device capabilities of the physical printer 126. This request is analogous to the DEVCAPS request described above. The request is received by the print server 104, in the process element 301. For example, the virtual printer 106 may receive the request from the client 130 and transfer the request to the printer object 110. The printer object 110, in turn, processes the request to access the device capabilities 203 of the physical printer 126. Afterwards, the printer object 110 provides a set of capabilities to the client 130 (via the virtual printer 106) using the print protocol of the physical printer 126, in the process element 303. The set of capabilities that are provided to the client 130 comprises system capabilities of the print server 104 as well as device capabilities of the physical printer 126. For example, the printer object 110 may configure a response to the client 130 with one or more of the system capabilities 202 of the print server 104 along with the device capabilities 203 of the physical printer 126. Alternatively or additionally, the printer object 110 may block access to certain system capabilities 202 and/or printer device capabilities 203 from the client 130. An example of such is shown and described in FIG. 4.

Figure 4:
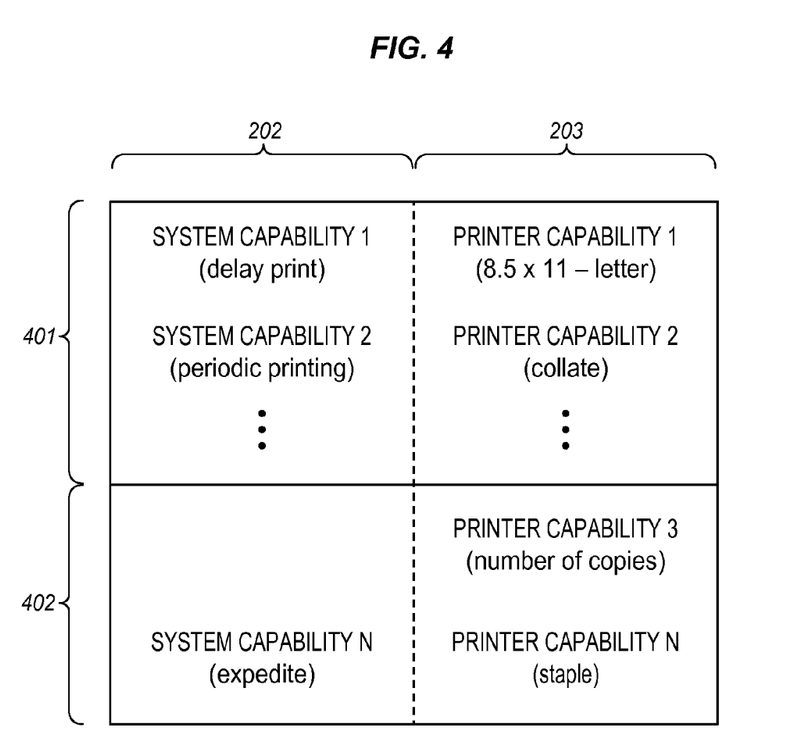
FIG. 4 illustrates the system capabilities and the capabilities of the printer object in the print shop architecture in an exemplary embodiment.

FIG. 4 illustrates a list of system capabilities 202 and device capabilities 203 of the physical printer 126 of the print shop architecture in an exemplary embodiment. In this embodiment, certain system capabilities 202 and certain device capabilities 203 are accessible by the client 130 via the print protocol of the printer 126. As a matter of management design choice, a system administrator may decide to block certain features of the printer 126 and/or the print server 104. For example, the system administrator may wish to provide system capabilities of delayed printing and periodic printing (system capabilities 1 and 2, respectively). However, the system administrator may wish to prevent access to expedited print processing (i.e., the system capability N, where N is simply intended to designate an integer greater than 1) of a print job so as to reduce interruptions to the print process, even though the print server 104 expressly establishes the capability. In similar fashion, the system administrator may wish to block access to certain printer capabilities. In this example, the number of copies and stapling features for print jobs (i.e., printer capabilities 3 and N, respectively) are blocked. Thus, the printer object 110 may configure a response to a request for device capabilities 203 of the physical printer 126 with some combination of system capabilities 202 and device capabilities 203 of the physical printer 126 (i.e., the accessible capabilities 401), while blocking various other system and device capabilities (i.e., the blocked capabilities 402). The invention, however, is not intended to be limited to any particular combination of system capabilities 202 or device capabilities 203.

It should be noted that the various capabilities shown and described within FIG. 4 are merely exemplary. Examples of other system capabilities include the ability to retain a print job after printing and document formatting (e.g., AFP, PDF, PostScript, etc.). A system administrator may access the current object and provide fewer or more system capabilities and/or printer capabilities as a matter of design choice. In this regard, the printer object 110 may be accessible by the system administrator via the GUI 118 to reconfigure the various system capabilities 202 and device capabilities 203 within the printer object 110. For example, the system administrator may wish to add certain system capabilities of the print server 104 to the printer object 110 as they become available and/or delete obsolete system capabilities. The system administrator may thus access the printer object 110 via the GUI 118 to reconfigure the system capabilities 202 of the printer object 110 as desired. The same type of reconfiguration may be performed for the device capabilities 203. It should also be noted that the invention is not intended to be merely limited to printers as other devices may be configured within the print shop architecture 102 as a matter of design choice. For example, the print shop architecture 102 may include multi-function printers with fax and scan capabilities that a client may wish to employ in a particular print job. In this regard, the print server 104 may have additional system capabilities to provide for faxing, scanning, and/or e-mailing of the print jobs.

Figure 5:
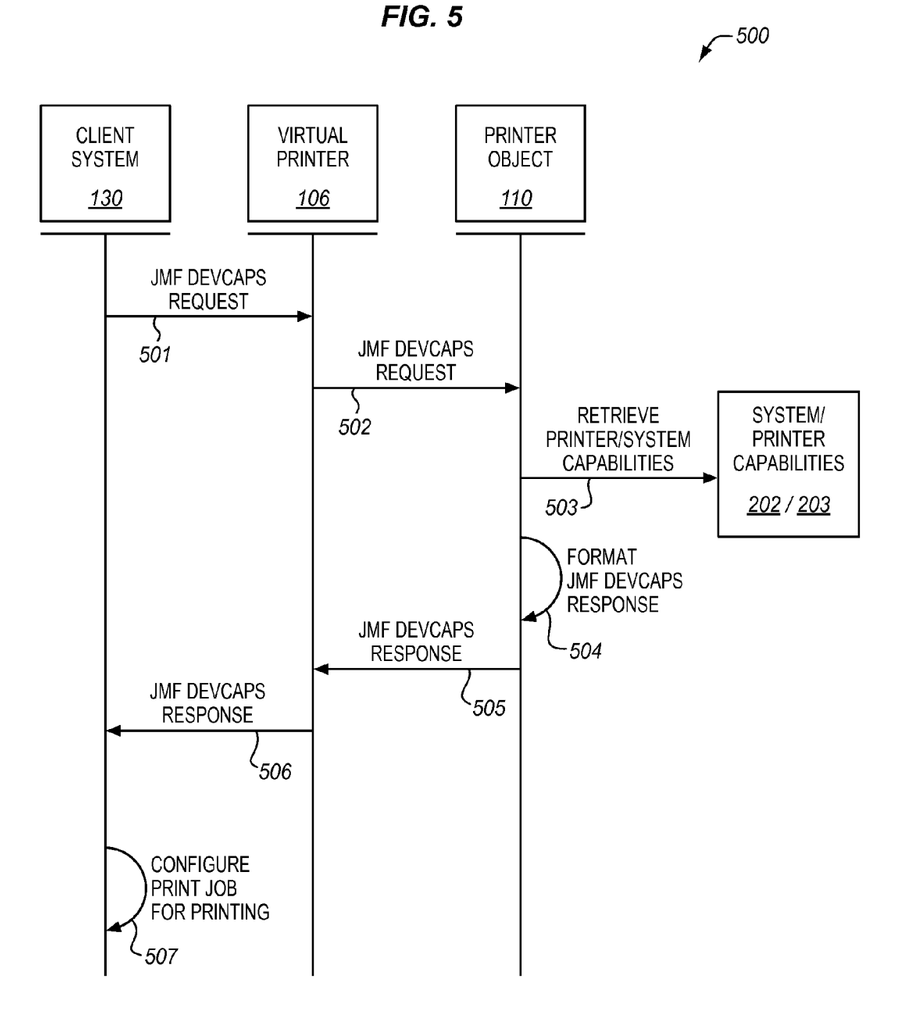
FIG. 5 illustrates a message diagram between us printer object at the client in an exemplary embodiment.

FIG. 5 illustrates a message diagram 500 between the printer object 110 and the client system 130 in an exemplary embodiment. In this embodiment, requests are configured in a JMF protocol. Before printing, the client system 130 may request the printing capabilities of the physical printer 126. The print server 104 interfacing between the client system 130 and the printer 126 manages the communications and controls of the printer 126. In this regard, the client system 130 initiates communications with a printer object 110 of the print server 104 by transferring a JMF DEVCAPS request to the virtual printer 106 (501). The virtual printer 106, in turn, transfers the request to the printer object 110 (502). As mentioned, the printer object 110 stores or otherwise maintains the capabilities 203 of the physical printer 126 as well as the system capabilities 202 of the print server 104. The printer object 110 accesses the capabilities and retrieves those capabilities that have been deemed accessible to the client system 130 (503). For example, the printer object 110 may be configured to block certain capabilities from the client system 130. Those system capabilities and/or printer capabilities that are deemed accessible to the client system 130 are then formatted in a JMF DEVCAPS response (504) and transferred to the virtual printer 106 via the JMF DEVCAPS response (505). The virtual printer 106, in turn, presents the accessible capabilities to the client system 130 via the JMF DEVCAPS response (506) such that the client system 130 may configure a print job (507) for processing via the print server 104 to ultimately print the print job via the printer 126. That is, the client system 130 may select certain capabilities that are presented by the JMF DEVCAPS response from the virtual printer 106 to prepare a print job for printing via the printer 126.

Figure 6:
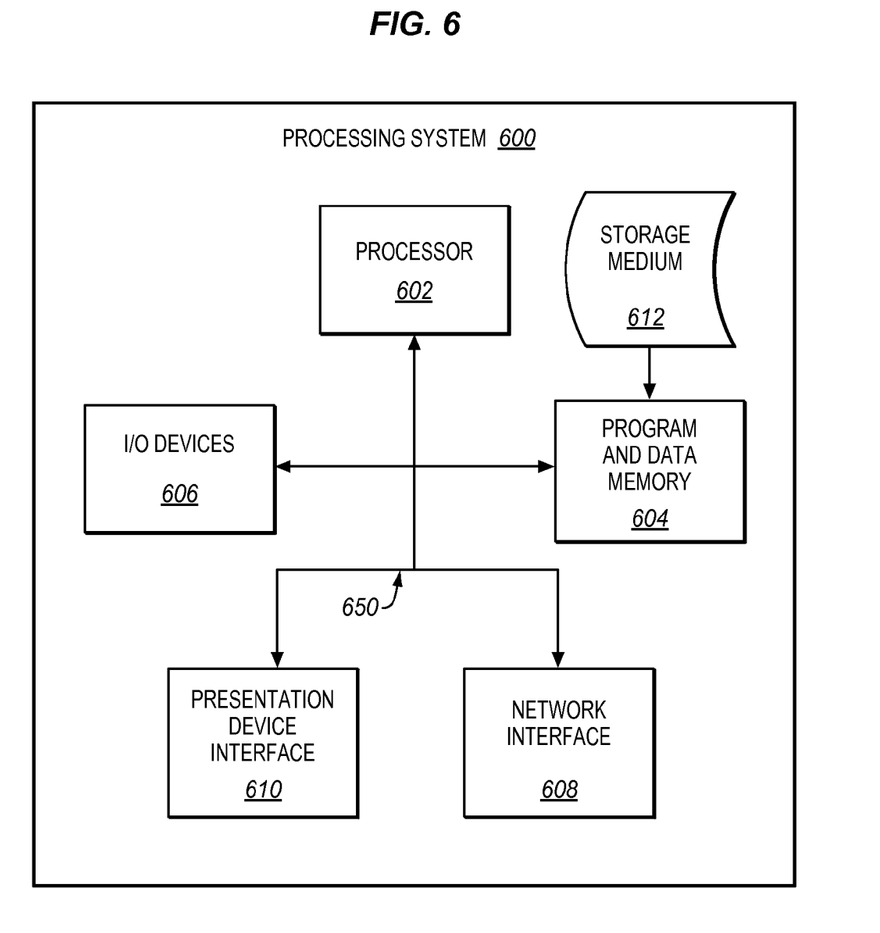
FIG. 6 illustrates an exemplary computer system operable to execute computer readable medium embodying programmed instructions to perform desired functions.

As mentioned, embodiments disclosed herein can take the form of software, hardware, firmware, or various combinations thereof. FIG. 6 is a block diagram depicting a processing system 600 also operable to provide the above features by executing programmed instructions and accessing data stored on a computer readable storage medium 612. In this regard, embodiments of the invention can take the form of a computer program accessible via the computer-readable medium 612 providing program code for use by a computer or any other instruction execution system. For the purposes of this description, the computer readable storage medium 612 can be anything that can contain, store, communicate, or transport the program for use by the computer.

The computer readable storage medium 612 can be an electronic, magnetic, optical, electromagnetic, infrared, or semiconductor device. Examples of the computer readable storage medium 612 include a solid state memory, a magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

A processing system 600, being suitable for storing and/or executing the program code, includes at least one processor 602 coupled to memory elements 604 through a system bus 650. The memory elements 604 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 606 (including but not limited to keyboards, displays, pointing devices, etc) can be coupled to the system either directly or through intervening I/O controllers. Network adapter interfaces 608 may also be coupled to the system to enable computer system 600 to become coupled to other data processing systems or storage devices through intervening private or public networks. Modems, cable modems, IBM Channel attachments, SCSI, Fibre Channel, and Ethernet cards are just a few of the currently available types of network or host interface adapters. A presentation device interface 610 may be coupled to the system to interface to one or more presentation devices, such as printing systems and displays for presentation of presentation data generated by processor 602.

Although shown and described with respect to automated processing of print job documents, such designations are merely intended to describe the general printing, sorting, and/or inserting of the documents. Accordingly, while specific embodiments are described herein, the scope of the invention is not limited to those specific embodiments. The scope of the invention is defined by the following claims and any equivalents thereof.

We claim:

1. A printing system, comprising:
a print process device operable to interface between a client system and a physical printer, and to process a print job for printing via the physical printer,
wherein the print process device comprises:
a printer object communicatively coupled to the physical printer, storing device capabilities of the physical printer, and operable to process a request for the device capabilities of the physical printer from the client system via a print protocol of the physical printer and provide a set of system capabilities of the print process device and device capabilities of the physical printer to the client system in response to the request,
wherein the system capabilities provide features of a print server and are different from the device capabilities which provide features of the physical printer, and wherein the system capabilities include forced settings for a user and definitions for when the print job is to be printed.

2. The printing system of claim 1,
wherein the printer object is further operable to block at least a portion of the system capabilities of the print process device from the client system and to block display of those blocked capabilities from the client system in response to the request.

3. The printing system of claim 1,
wherein the printer object is further operable to block at least a portion of the device capabilities of the physical printer from the client system and to block display of those blocked capabilities from the client system in response to the request.

4. The printing system of claim 1, further comprising a user interface operable to access the printer object to change the set of system capabilities of the print process device and device capabilities of the physical printer provided to the client system.

5. The printing system of claim 1,
wherein the print protocol of the print job is a Job Definition Format protocol, and
wherein the request is a Device Details Query of a Job Messaging Format request.

6. The printing system of claim 1, wherein the client system comprises:
a graphical user interface operable to allow the user to edit print parameters of the print job and to display a preview of the print job; and
a request unit operable to request the device capabilities of the physical printer and to receive the set of the system capabilities of the print process device and the device capabilities of the physical printer from the print process device.

7. A method operable in a print shop architecture, comprising:
receiving a request from a client system via a print server for device capabilities of a physical printer, wherein the request is a command of a print protocol operable with the physical printer;
processing the request with a printer object in the print server to access the device capabilities of the physical printer; and
providing a set of system capabilities of the print server and at least a portion of the device capabilities of the physical printer from the printer object to the client system in response to the request,
wherein the system capabilities provide features of the print server and are different from the device capabilities which provide features of the physical printer, and
wherein the system capabilities include forced settings for a user and definitions for when a print job is to be printed.

8. The method of claim 7,
further comprising blocking at least a portion of the system capabilities of the print server from the client system and blocking display of those blocked capabilities from the client system in response to the request.

9. The method of claim 7,
further comprising blocking at least a portion of the device capabilities of the physical printer from the client system and blocking display of those blocked capabilities from the client system in response to the request.

10. The method of claim 7, further comprising:
accessing the printer object via a user interface to change the system capabilities of the print server, the device capabilities of the physical printer, or a combination thereof within the printer object.

11. The method of claim 7, wherein the print protocol of the print job is a Job Definition Format protocol, and
wherein the request is a Device Details Query of a Job Messaging Format request.

12. The method of claim 7, further comprising:
providing a graphical user interface within the client system operable to allow the user to edit print parameters of the print job and to display a preview of the print job; and
providing a request unit within the client system operable to request the device capabilities of the physical printer and to receive the set of the system capabilities of the print process device and the device capabilities of the physical printer from the print process device.

13. A non-transitory computer readable medium comprising software instructions that, when executed on a processor, are operable to direct the processor to perform a method operable in a print shop architecture, the software instructions being further operable to direct the processor to:
receive a request from a client system via a print server for device capabilities of a physical printer, wherein the request is a command of a print protocol operable with the physical printer;
process the request with a printer object in the print server to access the device capabilities of the physical printer; and
provide a set of system capabilities of the print server and at least a portion of the device capabilities of the physical printer from the printer object to the client system in response to the request,
wherein the system capabilities provide features of the print server and are different from the device capabilities which provide features of the physical printer, and
wherein the system capabilities include forced settings for a user and definitions for when a print job is to be printed.

14. The computer readable medium of claim 13, wherein the software instructions are further operable to:
block at least a portion of the system capabilities of the print server from the client system and to block display of those blocked capabilities from the client system in response to the request.

15. The computer readable medium of claim 13, wherein the software instructions are further operable to:
block at least a portion of the device capabilities of the physical printer from the client system and to block display of those blocked capabilities from the client system in response to the request.

16. The computer readable medium of claim 13, wherein the software instructions are further operable to:
access the printer object via a user interface to change the system capabilities of the print server, the device capabilities of the physical printer, or a combination thereof, within the printer object.

17. The computer readable medium of claim 13,
wherein the print protocol of the print job is a Job Definition Format protocol, and wherein the request is a Device Details Query of a Job Messaging Format request.

* * * * *